United States Patent [19]

De Cock

[11] 3,761,726
[45] Sept. 25, 1973

[54] PHOTOELECTRIC DEVICE FOR MEASURING VARIATIONS IN THE OPTICAL DENSITY OF A MOVING WEB

[76] Inventor: Etienne Marie De Cock, Calvarieberg 11, Hamme, Belgium

[22] Filed: Oct. 28, 1971

[21] Appl. No.: 193,421

[30] Foreign Application Priority Data
Oct. 29, 1970 Great Britain.................. 51,518/70

[52] U.S. Cl.................250/571, 250/227, 356/199
[51] Int. Cl.... G01n 21/18, G01n 21/30, G02b 5/14
[58] Field of Search...................... 250/219 FR, 227; 356/199

[56] References Cited
UNITED STATES PATENTS 2,196,867  4/1940  Knoop ........................ 250/219 FR
3,489,909  1/1970  Martel ......................... 250/219 FR
1,981,999  11/1934  French........................... 250/227 X Primary Examiner—James W. Lawrence
Assistant Examiner—T. N. Grigsby
Attorney—William J. Daniel

[57] ABSTRACT

A photoelectric device for measuring variations in the optical density of a moving web of radiation diffusing material. The device comprises a phototransistor mounted at one side of the web and a light source mounted at the other side of the web. Between the web and the transistor one or more mirrors are mounted normal to the plane of the web. The location and dimensions of the mirror or mirrors is such that variations in the distance between the web and the detector have substantially no effect on the output of the phototransistor so that the device is insensitive to vibration and tilting of the web.

7 Claims, 9 Drawing Figures

PATENTED SEP 25 1973 3,761,726
SHEET 1 OF 3
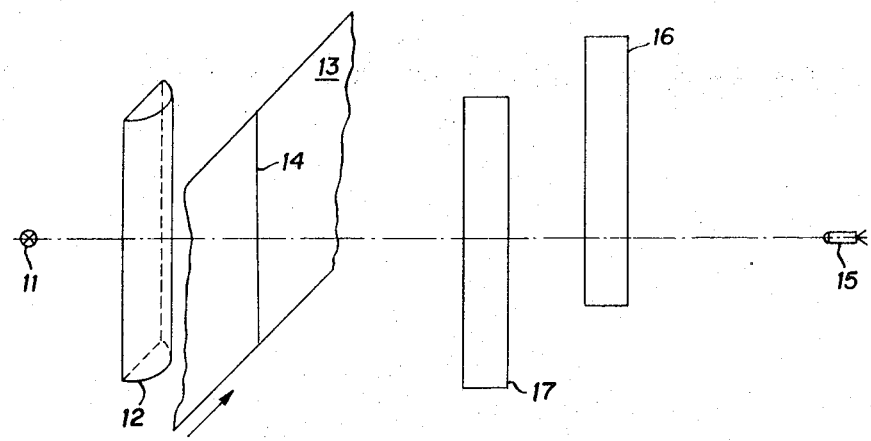
Fig. 1
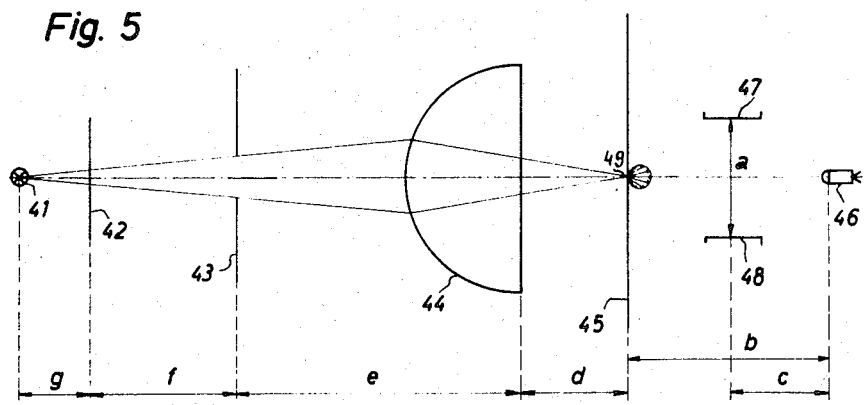
Fig. 5
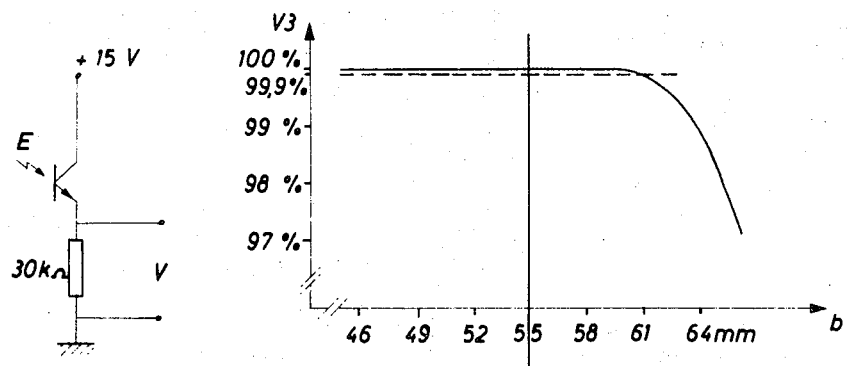
Fig. 6
Fig. 9

PHOTOELECTRIC DEVICE FOR MEASURING VARIATIONS IN THE OPTICAL DENSITY OF A MOVING WEB

The present invention relates to a photoelectric device for measuring the optical density of a moving web.

When a web is transported by, e.g., a number of rollers, the web tends to vibrate. These vibrations do not seriously disturb measurement of the density of a web of specular, i.e., non-scattering material, but as the vibrations involve changes in the distance between the web and a detector used for detecting radiation modulated by the web, the vibrations to disturb measurement of the density of a web of radiation-diffusing material.

In addition, the web tends to produce folds as a consequence of tensional forces which are not uniformly distributed in the web material. Driving rollers and guide rollers for the web frequently create tensional forces in the web material which run at a certain angle with respect to the longitudinal axis of the web, so that folds are created which extend diagonally from one edge of the web to the opposite edge thereof. As such folds pass in front of a detector used for detecting radiation modulated by the web, the energy which is directed to the detector is considerably reduced because at the locus of the fold the plane of the web has been tilted actually, so that the main direction into which energy is radiated by a radiation-diffusing web is no longer directed towards the detector.

It has been proposed to overcome difficulties which occur in measuring the thickness of scattering photographic layers by using an optical means in the path of the radiation to prevent scattering of the radiation after the latter has passed through the photographic layer and before it reaches a photoelectric detector.

The optical means is adapted to receive and transmit rays having a wide angle of propagation as they emerge from the photographic layer.

An important requirement for the satisfactory operation of said known means is the very close position of the radiation entry end of the optical means to the plane of the film, since the greater this distance, the smaller the angle over which radiation can be captured.

It has been shown that frequently this requirement cannot be met in practice, since vibration and tilting of webs cannot be avoided and in consequence a relative great minimum distance between the web and the optical receiving means must exist in order to prevent the web from touching some part of the device. However, the increase of the mentioned distance causes the measuring signal to become highly dependent on flattering and tilting of the web in case such web is a material which is scattering the radiation projected thereon.

It is the object of the invention to provide a photoelectric device for measuring the density of a moving web of radiation-diffusing material, wherein the energy impinging on the detector is not materially affected by vibration or tilting of the web, and wherein the distance between the web and the measuring system need not be very small.

A photoelectric device according to the present invention comprises a radiant energy source, a detector with a photosensitive surface mounted in such a way that the photosensitive surface receives radiant energy which has been emitted by said source and which has been modulated by the web material, and at least one radiant energy reflecting mirror which is arranged substantially normal to the plane of the web to reflect some of the modulated radiation which would otherwise not reach said detector and get lost, the distance between the true guide planes of the web material and the detector, the form and location of the mirror or mirrors and the dimensions of the mirror or mirrors and the detector being such that variations in the distance between the web and the detector which occur on account of vibration or tilting of the web have substantially no effect on the amount of modulated radiation incident on the said detector surface.

The actual distance between the detector and the true guide plane of the web may be such that in a graph plotting the energies incident upon the sensitive surface of the detector for different distances of the detector from the web, the said actual distance lies at a position on the graph curve where $\delta E/\delta 1 \approx 0$ wherein E is the energy incident upon the detector surface and 1 is the said actual distance.

The degree of accuracy of the density measurement which is required depends on the particular purposes in view of a given use of the device. In general, devices are preferred wherein the energy incident upon the detector surface does not vary by more than 1‰ in consequence of the vibrations of the web.

The device may be designed so as to indicate actual optical density values or signals representing these values, or the device may be designed so as merely to indicate variations in optical density from one position on the web to another or so as to indicate when the optical density does not comply with some predetermined specification, i.e., a specification comprising a minimum and/or a maximum permissible optical density.

Certain embodiments of the invention will be described with reference to the accompanying drawings in which:

FIG. 1 shows an embodiment of the invention in perspective.

FIG. 2 diagrammatically shows the embodiment according to FIG. 1 in cross section.

FIG. 5 shows the arrangement of a further embodiment of the invention.

FIG. 6 shows an electronic circuit for the phototransistor used in FIG. 5.

FIG. 9 illustrates the insensitivity of the output signal of the phototransistor according to the arrangement of FIG. 5 for vibration of the film.

Figure 2:
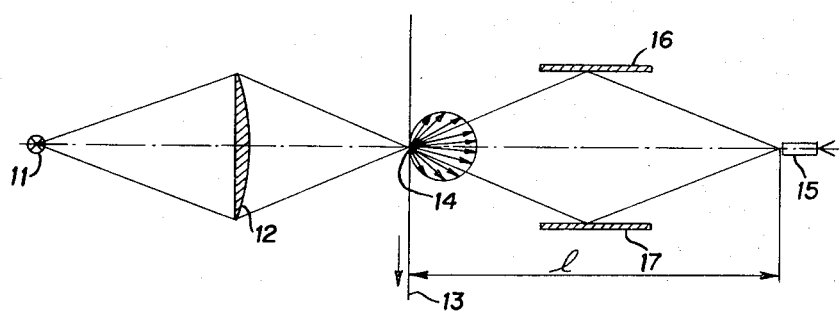

In FIGS. 1 and 2 an embodiment of the invention is shown. A lamp 11 directs, e.g., infrared light to a lens 12 that directs a beam of converging light rays to a web material such as, e.g., a nonexposed photographic film 13 moving in the direction as indicated by the arrow. The lens 12 is so arranged that a sharp line of light 14 is projected on the moving film 13. If the film 13 is a material which diffuses the radiation used, such as an X-ray film, the line of light 14 must be considered as a diffuse rotation of light. At the other side of the film 13 there is a photoelectric detector 15, e.g., a photo transistor at a distance 1 from the line of light 14. Between the detector 15 and the line of light 14 radiation reflecting rectangular mirrors 16 and 17 are arranged perpendicular on the plane of the film 13. The arrangement is such that at least a part of the energy from the radiating line 14 is reflected by the mirrors 16 and 17 and impinges on the detector 15.

Figure 4:
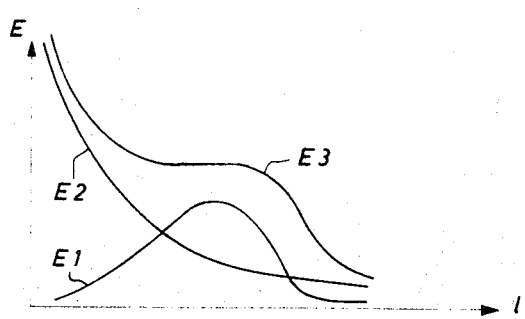
FIG. 4 shows a graph of the energy incident upon the photoelectric detector as a function of the distance between the plane of the web and the detector.

In FIG. 4 a graph is shown of the energy $E_2$ impinging on the photoelectric detector 15 as a function of the distance 1 between the detector 15 and the film 13, when no mirrors 16 and 17 are provided. A similar graph can be recorded for the energy $E_1$ reflected by the mirrors 16 and 17, as the distance between the film and the mirrors varies, radiation being prevented from directly impinging on the detector by suitable interception means such as a black screen on the optical axis between the mirrors 16 and 17. The resulting energy $E_3$ received on the detector 15 is the sum of $E_1$ and $E_2$ and is relatively constant in a certain range of 1.

The graph showing $E_3$ as a function of 1 may have one or more extremes, i.e., points where the tangent on the curve lies horizontally, the values of the distance 1 corresponding to these points satisfying $\delta E/\delta^1 = 0$.

As a result of the vibration of the film 13 the line of light 14 will become alternatively broader and narrower, but the quantity of energy directed to the film 13 remains almost constant. When the distance 1 and the location of the mirrors are such that the tangent on the curve $E_3$ is horizontal, then the energy input of the detector 15 will be unaffected by the vibration of the film.

The embodiment of FIGS. 1 and 2 is also substantially insensitive to tilting of the plane of the web 13, i.e., rotation of the web round its longitudinal axis. If the plane of the web 13 is, e.g., tilted over 5° around the line of light 14, i.e., the upper edge of the film approaching towards the detector 15 and the lower edge of the film withdrawing therefrom (FIG. 1), this will have no measurable effect on the energy input of the detector 15 when the web 13 is a material diffusing the radiation used.

Figure 3:
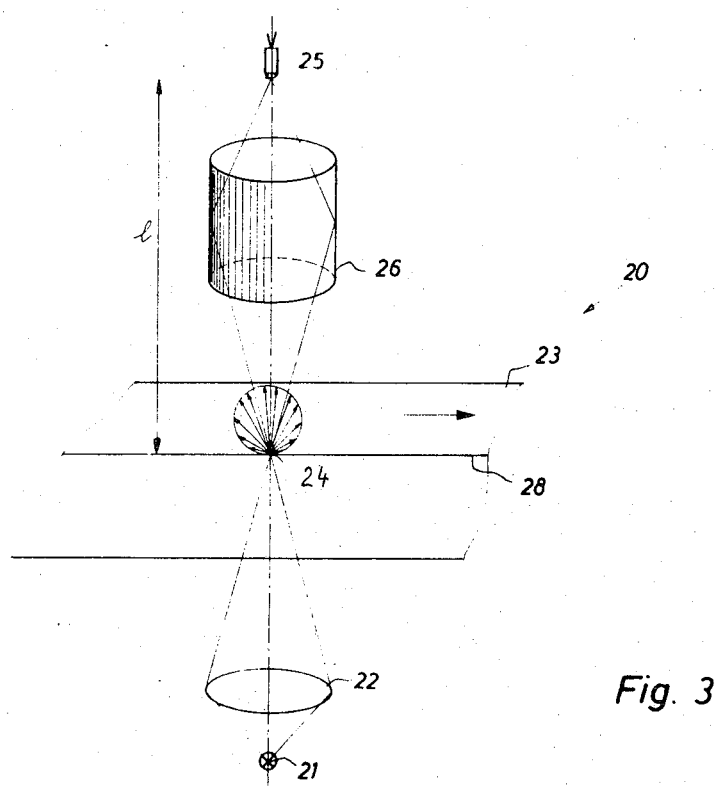
FIG. 3 shows another embodiment of the invention in perspective.

In the embodiment of the invention according to FIG. 3 use is made of a lens 22 that focusses the light of the lamp 21 on the film 23. This light forms a diffuse radiating spot 24 on the other side of the film 23 when the latter is a material diffusing the radiation. At this other side a detector 25 is arranged at a distance 1 from the film 23. Between the detector 25 and the spot 24 an annular mirror 26 is arranged in the radiation path. The annular mirror 26 is, e.g., made of a glass ring the inner surface of which has a metal coating. The described arrangement permits to measure density variations along a line 28 on the film 23.

The arrangement according to FIG. 5 was used for carrying out a number of measurements. To an incandescent lamp 41 of nominal 24 V - 15 W, a voltage of 15 V is applied. The numeral 42 refers to an infrared radiation transmitting filter which is placed at a distance $g$ of 50 mm from the filament of the lamp 41. A slotted diaphragm 43 is positioned at a distance $f$ of 50 mm from the filter 42. At a distance $e$ of 74 mm from the diaphragm 43 a semi-cylindrical lens 44 is fitted the curved side thereof facing the lamp 41. At a distance $d$ of 41 mm from the lens 44 a photographic film 45, such as radiographic film which diffuses infrared radiation, is placed. At a distance $b$ of 55 mm from the film 45 a photoelectric detector such as a phototransistor 46 (type MRD 200 of Motorola) is located. Between the transistor 46 and the film 45 at a distance $c$ of 30 mm from the transistor 46 two parallelly spaced rectangular mirrors 47 and 48 are arranged in a plane normal to the plane of the film 45. The dimensions of the mirrors 47 and 48 are 15 × 50 mm, the longitudinal edges running parallel to the optical axis, and the distance $a$ between the mirrors is 24 mm.

The phototransistor 46 is connected as represented in FIG. 6. The collector is connected to a voltage source of + 15 V, the emitter is connected to ground through a 30 $k\ \Omega$ resistor and the output voltage V is measured over the resistor and is a measure for the energy quantity E impinging on the basis of the transistor 46.

Figure 7:
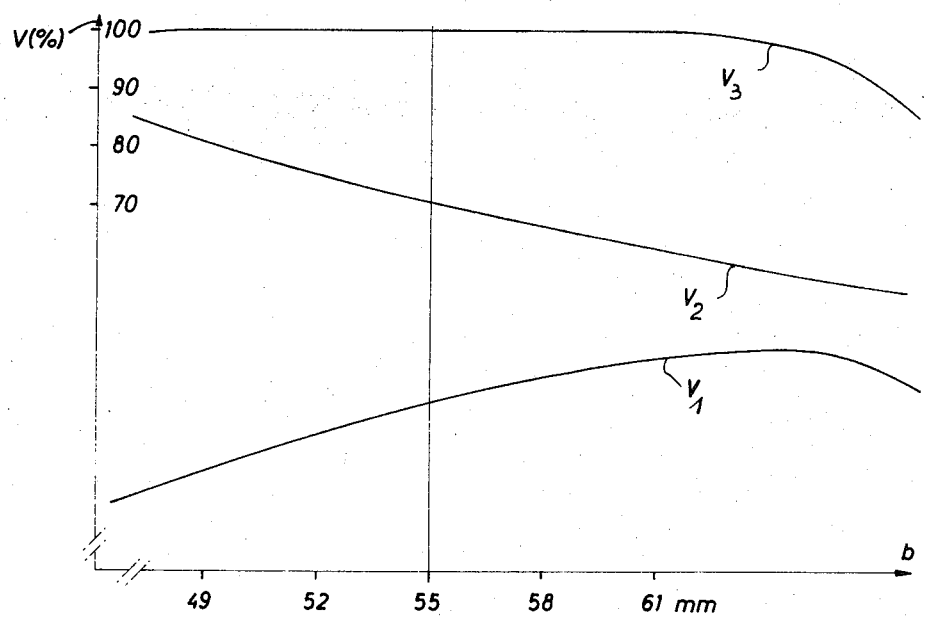
FIG. 7 shows the output voltage V of the phototransistor of the arrangement according to FIG. 5.

FIG. 7 shows the output signals $V_1$, $V_2$ and $V_3$, as a function of $b$. $V_1$ is the output voltage as a function of $b$, the mirrors 47 and 48 being removed, $V_2$ is the output for which the radiation reflected by the mirrors is responsible, and $V_3$ is the sum of $V_1$ and $V_2$. It should be understood that for determining $V_2$ only $b$ is varied, $e$ remaining unaltered.

Figure 8:
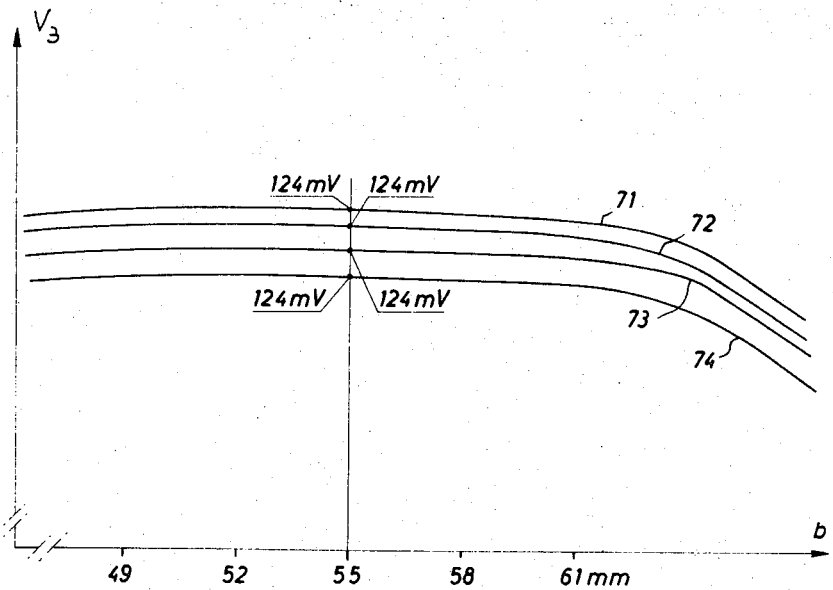
FIG. 8 shows the output voltages V for different orientations of the film.

FIG. 8 shows some curves of $V_3$ as a function of $b$. Actually, the curves coincide for the greater part, but for sake of clarity the curves have been mutually shifted in the vertical direction, the points of 124 mV being indicated for each curve separately. The curve 71 refers to the signal $V_3$ as a function of $b$ for a medical radiographic film when the film plane has been tilted through 5° round a line of the light 49 (FIG. 5). The curve 72 refers to the case when the film is situated in its normal position, i.e., in a plane normal to the mirrors 47 and 48. The curve 73 refers to a film 45 which is tilted through 5° round its longitudinal axis, i.e., a line normal to the center of the line of the light 49 and normal to the plane of the mirror 47. The curve 74 refers to a film 45 which is shifted through 5° round the line of the light 49 and through 5° round a line normal to the centre of the line of the light 49 and normal to the plane of the mirror 47.

It may thus be concluded that the arrangement according to FIG. 5 is highly insensitive to displacements of the film parallel to its plane and to tilting of the film through angles of 5°.

In the illustration according to FIG. 9 a curve of the voltage $V_3$ as a function of $b$ is drawn wherein the vertical scale has been elongated to a considerable extent. As may be seen from this figure, the output voltage varies less than 0, 1‰ for film displacements of 4 mm at either side of the state of equilibrium.

We claim:

1. A method of measuring the optical density of a light-diffusing film moving along a generally linear normal path, comprising the steps of:
    a. projecting a light of uniform intensity on a generally constant area of the film from one side of the film,
    b. arranging a light detector generally on the optical axis of said lighted area at the opposite side of and at a predetermined distance from said film path to receive light from said area by direct transmission through the air, said detector having a predetermined limited dimension normal to said optical axis,
    c. interposing in the space between said film path and said detector two opposed light reflecting surfaces extending parallel to said optical axis in symmetrical spaced relation to said axis, the distance between said surfaces measured in a direction normal to said axis being substantially greater than said limited dimension of said detector in said normal direction, said surfaces having a length in the direction parallel to said optical axis less than the separation between said film path and detector but convering at least a central portion of said separation and terminating in spaced relation to at least said film path, whereby said surfaces are adapted to reflect toward said detector a fraction of the diffused light emanating from the spot on said film, and d. determining in advance the separation of the detector and said film path and the spacing between said reflecting surfaces being selected by:
1. repeatedly measuring the amounts of energy received by said detector from a lighted central area of uniform intensity while moving said detector over a range of distances gradually spaced away from said film path and moving said reflecting surfaces symmetrically apart in grandually increasing amounts, and
2. locating said detector and said surfaces at those points at which the amount of energy received by said detector is at a perceptible constant level substantially free of variation over a distance at least generally equal to expected displacements of said film from said normal path, whereby the light detector measurements of said moving film are substantially independent from small displacements of said film from said linear path.

2. A method according to claim 1 wherein said lighted area on the film has the form of a circular spot.

3. A method according to claim 1 wherein said lighted area on the film has the form of a line extending transversally of the film.

4. Photoelectric device for measuring the optical density of a radiation diffusing film moving along a generally linear normal path comprising:
a. an energy projection means for projecting radiant energy on a limited area of the moving film,
b. a detector having an energy sensitive surface mounted at the opposite side of the film on the optical axis of the projection means, for receiving with its sensitive surface radiant energy ($E_0$) by direct radiation from the irradiated area of the film, and
c. at least one energy reflecting surface arranged between said film and said detector in generally spaced parallel relation to said optical axis, each such reflecting surface having a length covering at least a central portion of the space between said film path and said detector and terminating in spaced relation to at least said film path, the distance separating each such surface from said optical axis being substantially greater than one half the surface dimension of said detector measured in a direction normal to said optical axis, said detector and each such reflecting surface being located at distances from said normal film path and said optical axis respectively determined by:
1. repeatedly measuring the amounts of energy received by said detector from a lighted central area of uniform intensity while moving said detector over a range of distances gradually spaced away from said film path and moving said reflecting surfaces symmetrically apart in gradually increasing amounts, and
2. locating said detector and said surfaces at those points at which the amount of energy received by said detector is at a perceptible constant level substantially free of variation over a distance at least generally equal to expected displacements of said film from said normal path, whereby minor displacement of the film from its normal path has substantially no effect on the total amount of energy received by the detector.

5. A device according to claim 4 wherein each such reflecting surface is constituted by a plane mirror.

6. A device according to claim 4 wherein two reflectors are arranged symmetrically on opposite sides of said optical axis.

7. A device according to claim 6 wherein both said reflecting surfaces are formed by portions of the peripheral reflecting inner surface of a cylinder.

* * * * *

UNITED STATES PATENT OFFICE
CERTIFICATE OF CORRECTION

Patent No. 3,761,726        Dated   September 25, 1973

Inventor(s)   Etienne Marie DE COCK

It is certified that error appears in the above-identified patent and that said Letters Patent are hereby corrected as shown below:

In the Heading of the Patent, insert --

Assignee:  Agfa-Gevaert N.V., Mortsel, Belgium --.

Column 5, lines 7 & 8, change "convering" to -- covering --.

Signed and sealed this 5th day of February 1974.

(SEAL)
Attest:

EDWARD M. FLETCHER, JR.            RENE D. TEGTMEYER
Attesting Officer                  Acting Commissioner of Patents